United States Patent [19]

Knapp et al.

[11] Patent Number: 4,566,489

[45] Date of Patent: Jan. 28, 1986

[54] QUICK DISCONNECT COUPLING APPARATUS

[76] Inventors: Frank W. Knapp; Caroline M. Knapp, both of Box 289, Mineral Point, Wis. 53565

[21] Appl. No.: 586,684

[22] Filed: Mar. 6, 1984

[51] Int. Cl.[4] ............................................. F16L 37/28
[52] U.S. Cl. .................................. 137/614; 285/376; 137/315
[58] Field of Search ............................ 251/142, 149.5; 137/614, 614.01, 315; 285/401, 402, 396, 376

[56] References Cited

U.S. PATENT DOCUMENTS

| | | | |
|---|---|---|---|
| 1,051,805 | 1/1913 | Danberg | 285/376 |
| 1,430,558 | 10/1922 | Jimerson | 285/376 |
| 2,459,477 | 1/1949 | Schuyver | 251/149.5 |
| 2,919,144 | 12/1959 | Lindenmeyer | 137/614 |
| 3,528,447 | 9/1970 | Kolb | 137/614 |
| 4,185,781 | 1/1980 | O'Brien | 285/376 |
| 4,335,747 | 6/1982 | Mitsumoto et al. | 137/614 |
| 4,416,305 | 11/1983 | Commette et al. | 137/614 |

FOREIGN PATENT DOCUMENTS 2447357  4/1976  Fed. Rep. of Germany ...... 137/614

*Primary Examiner*—A. Michael Chambers

[57] ABSTRACT

A quick-disconnect hydraulic coupling apparatus for connecting fluid lines of a fluid handling system provides substantially unrestricted fluid flow through the coupler assembly. The coupler apparatus includes male and female coupler devices adapted to be connected together and each of which includes a manually operated ball valve which provides a fluid flow path through the coupling apparatus having a cross-sectional area at least as great as that of hydraulic lines which the couplers interconnect. The coupling apparatus provides positive linear locking which maintains the male and female coupling units in linear alignment preventing inadvertent disconnection of the coupler devices.

1 Claim, 3 Drawing Figures

U.S. Patent    Jan. 28, 1986    4,566,489
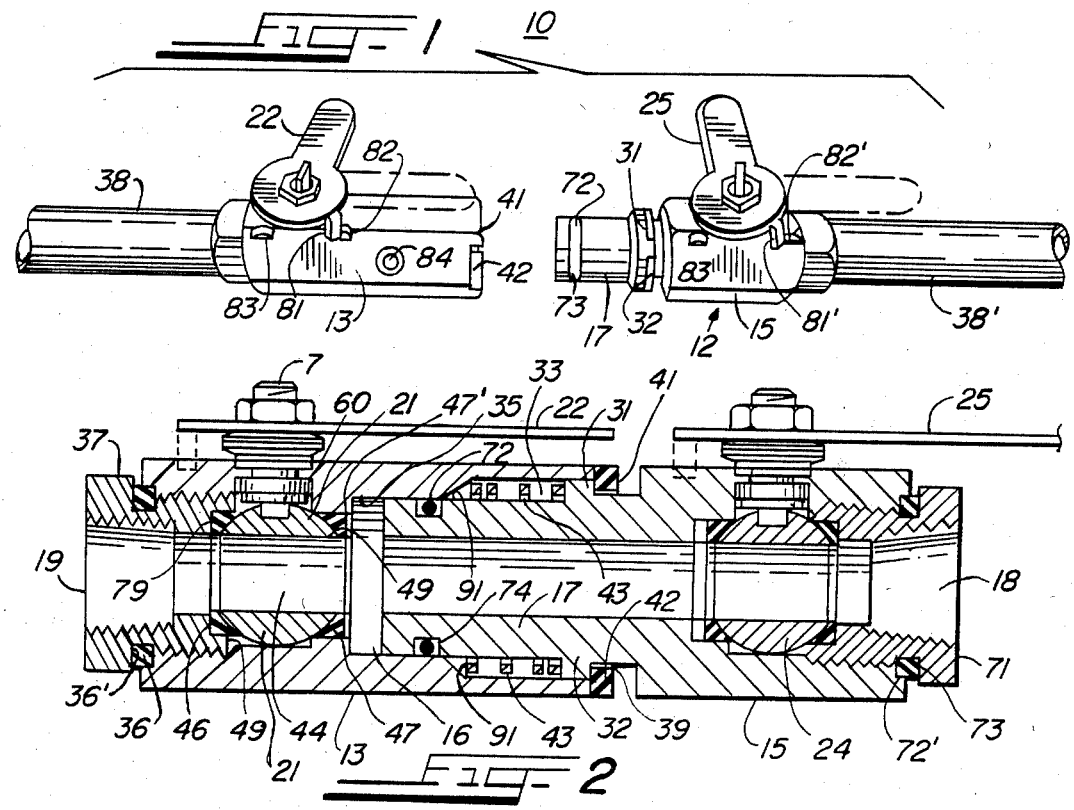
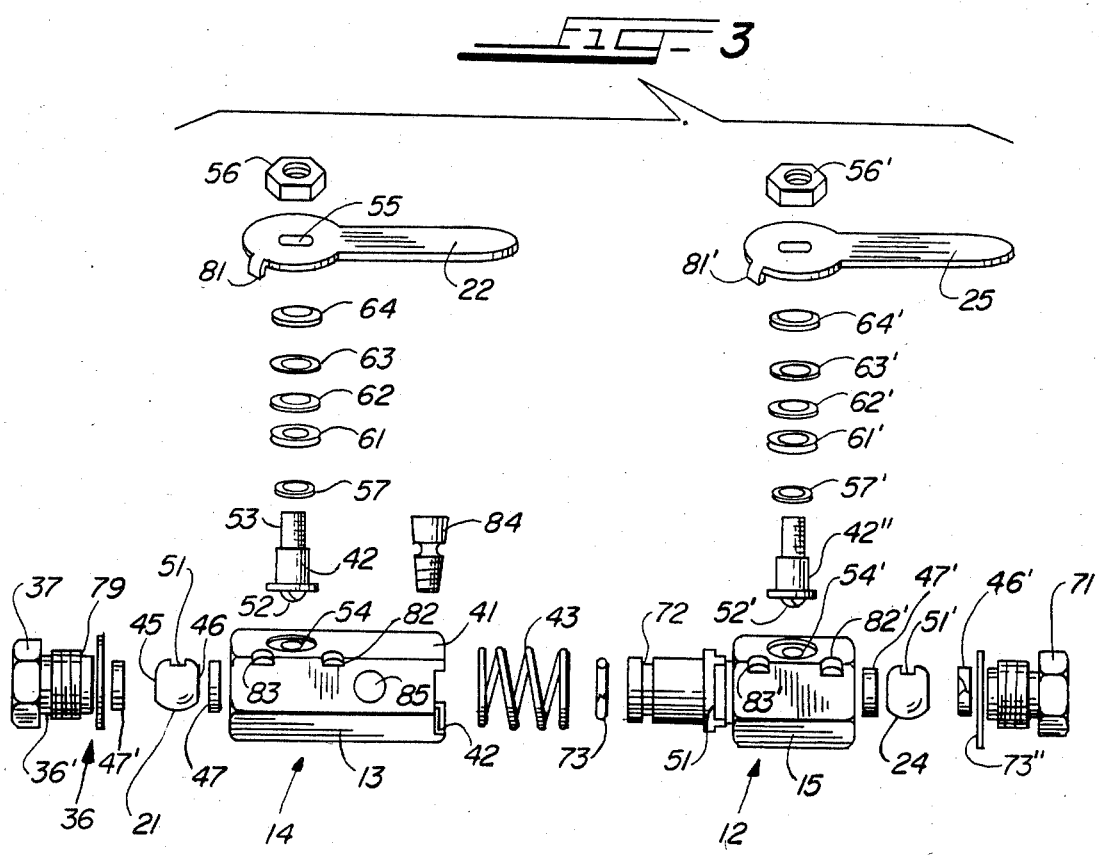

QUICK DISCONNECT COUPLING APPARATUS

BACKGROUND OF THE INVENTION

This invention relates to high pressure coupling devices, and more particularly to a quick-disconnect coupling assembly for coupling and decoupling gas or liquid operated equipment to and from the source whether under pressure or not.

Quick disconnect coupling devices are used to connect fluid lines for agricultural and industrial equipment, for example, to a source of fluid under pressure, such as that provided by a pump or a tractor. Such couplings commonly have a check valve in each coupling half, which is closed when the parts are disconnected, but which is opened as the result of the connecting of the coupling halves together. It is known that such couplers generally do not disconnect easily under pressure, because disconnection of the coupling members requires pushing one coupling member into the other against the high-fluid pressure. Attempts have been made to solve this problem by balancing fluid pressures acting on the check valves, by designing coupling members with different inner dimensions for the coupling halves, or by providing biasing arrangements which provide controlled operation of the check valves during coupling and uncoupling.

For the most part, attempts at developing fluid coupling devices which enable disconnection under pressure have resulted in the introduction of further flow control members such as pistons, poppet valves, ball check valves and the like, into the fluid flow path provided through the couplers. However, restrictions caused by internal workings of fluid checking devices, including the check valves normally used and other flow control members introduced to facilitate coupling and decoupling, create excessive pressure drop across the assembled couplers. Such pressure drop, in turn, causes extreme heat to develop at the coupling device which may result in breakdown of fluid seals used in present couplers. Such fluid flow restriction also results in wear and tear on the hydraulic pumps as well as on the equipment being used by causing the equipment to fail to respond as quickly as is desired. This is because restrictions prevent the hydraulic fluid from flowing swiftly and freely through the coupler. For example, in couplers presently in use, typically the fluid is pumped through a space of 1/10th of a square inch. The pump in the tractor, or other machinery, pumps approximately 18–22 gallons per minute. Obviously, when this much fluid is pumped through a space of 1/10th of a square inch, restriction of the fluid flow will cause a resulting pressure drop with an attendant heat buildup. Due to the restricted flow of the hydraulic fluid, as the hydraulic control levers are operated by the operator, a smooth response of the equipment will not always occur so that the equipment may exhibit a jerking effect when being raised or lowered. Such operation is hard not only on the equipment but also on the hydraulic system of the tractor which controls the equipment.

As indicated above, previous attempts to alleviate the problems associated with coupling and uncoupling hydraulic coupling units under pressure conditions usually have resulted in the introduction of further fluid flow control elements into the coupling devices and in the fluid flow passage they provide between the hydraulic hose connected to the pressurized hydraulic fluid source and hydraulic hose connected to the equipment controlled by the fluid. This approach not only increases the number of parts susceptible to wear, but also makes servicing of the coupling devices virtually impossible. In many cases, such couplers are neither serviceable nor repairable.

SUMMARY OF THE INVENTION

The present invention provides a fluid connecting apparatus which provides substantially unrestricted fluid flow through the coupler assembly thereby obviating problems caused by prior art couplers which are characterized by excessive pressure drop because of restrictions caused by internal workings of the fluid checking devices. Instead of using checking devices, the coupler apparatus provided by the present invention employs manually operated ball valves which allow positive shutoff and which provide a fluid flow path through the valve which has the same cross-sectional area as that of a standard hydraulic hose. Consequently, there is minimal restriction of fluid and little wear and tear on the internal mechanism of the coupling apparatus. The coupling apparatus has a positive linear locking mechanism which maintains the male and female coupling units in linear alignment and prevents wear and tear on the sealing members. Moreover, the coupling assembly comprises a minimum number of parts and is characterized by ease of assembly and maintenance.

In accordance with this invention, a quick-disconnect coupling apparatus for interconnecting first and second fluid lines of a fluid handling system comprises a pair of coupler members each connectable to a different one of the first and second fluid lines, means for coupling the coupler members together and each of the coupler members including a flow control means operable between flow permitting and flow preventing positions to permit or prevent fluid flow through the associated coupler member. In accordance with the invention, each of the flow control means when operated to its flow permitting position defines a portion of the fluid flow path through the coupling apparatus with the fluid flow path through the coupling apparatus having a substantially uniform cross-sectional area, and with the cross-sectional area of the fluid flow path through the coupling apparatus corresponding substantially to the cross-sectional area of the first and second fluid lines.

Further in accordance with the invention, one of the members defines a sleeve-type receptacle portion, the other one of the coupling members having a portion with a reduced outer diameter defining a tip portion adapted for insertion into the sleeve-type portion to be retained therein by way of a locking means defined by the two coupler members.

In accordance with a disclosed embodiment, one of the coupler members defines a pair of diametrically opposed retaining flanges or projections on the tip portion, and the other coupling member defines a channel extending partially around the periphery of the sleeve portion and terminating at diametrically opposed stop surfaces which are engageable by the retaining flanges of the other member when the coupling members are coupled together, and a bias means urges the projections into engagement with the stop surfaces.

Further in accordance with a disclosed embodiment, the flow control means of each coupling member comprises a manually operable ball valve including a ball member mounted within the coupling member and located in the fluid flow path for axial pivotal movement.

The ball member is pivotable between flow permitting and flow preventing positions and has an axial bore corresponding in cross-sectional area to the cross-sectional area of the fluid flow path of the coupling apparatus. Thus, when either ball valve is operated to its closed position, fluid flow through the coupling apparatus is interrupted. Whenever both ball valves are operated to their flow permitting position, a flow path for fluid through the coupling apparatus is provided, the flow path having a substantially uniform cross-sectional area through the coupling apparatus.

Other features and advantages of the present invention will become apparent from the following detailed description.

DESCRIPTION OF THE DRAWINGS

FIG. 1 is an exploded perspective view of the coupling apparatus of the present invention showing the female and male couplers in line but not connected;

FIG. 2 is a longitudinal sectional view of the hydraulic coupling apparatus with the female and male couplers assembled; and FIG. 3 is an exploded view of the hydraulic coupling apparatus shown in FIG. 1.

DESCRIPTION OF THE PREFERRED EMBODIMENTS

Referring to FIG. 1 of the drawings, the hydraulic coupling apparatus 10 includes a male coupler 12 adapted for connection to a fluid conduit leading to hydraulic apparatus (not shown) and also includes a tip or female coupler 14. By way of example, the hydraulic coupling apparatus may be used in a hydraulic system for operating agricultural and industrial implements with the male coupler 12 being associated with and connected to the hydraulic line of the agricultural implement and the female coupler 14 being associated with and connected to the hydraulic line from the output of a pump in the tractor which pulls the farm implement. Since the coupling apparatus provides a bi-directional flow path, coupler 14 may be associated with a pressure source and coupler 12 associated with the apparatus being controlled.

This coupler apparatus, although described with use with agricultural equipment, may be used with many industrial applications and may be of any size and with any size hose. The basic design may be used with either liquids or gases.

The female coupler 14 has a sleeve portion 16 which is adapted to receive a tip portion 17 of the male coupler 12 when the couplers are assembled together as shown in FIG. 2. The female coupler 14 includes a ball valve 21 which is manually operable by way of a handle 22 to open and closed positions, fluid flow through the female coupler 14 being permitted when the valve is in the open position and being prevented when the valve is in the closed position. Similarly, the male coupler 12 includes a ball valve 24 manually operable by way of a handle 25 between open and closed positions for permitting or preventing fluid flow through the male coupler 12.

As can be clearly seen in FIG. 2, when the ball valves 21 and 24 are in the open position, a substantially unrestricted passageway for hydraulic fluid flow is provided through the assembled coupler devices. The cross-sectional area of the fluid flow path is substantially the same as that of the fluid inlet edge 19 at the left-hand side of FIG. 2 or the fluid outlet edge 18 at the right-hand side of FIG. 2. The inner diameter of the coupler fluid flow path corresponds to the inner diameter of a standard hydraulic hose, such as hoses 38 and 38' shown in FIG. 1, and may, for example, be one-half inch. Thus a full one-half inch fluid flow path is provided through the coupler, including valves 21 and 24 and tip 17 of male coupler 12, and there is minimal pressure drop resulting from restriction of fluid therewith. A larger fluid flow path, say three-quarter inches in diameter, may be provided for certain applications, and would be used with three-quarter inch hydraulic hoses, resulting in an unrestricted flow path for the three-quarter inch line as well. The ball valves 21 and 24 control the flow of hydraulic fluid through the coupler apparatus 10 and no ball check valves are employed so that the coupling apparatus provides a bi-directional flow path.

When assembled, the female coupler 14 and male coupler 12 are locked together as the result of engagement of a pair of quarter round flanges 31 and 32 provided on the outer surface of the tip 17 of the male coupler, and stop surfaces 41, 42 defined by a channel 33 extending partially around the periphery of the sleeve member on the inner surface of the female coupler 14. As will be shown, in connecting the female and male couplers together, the tip 17 of the male coupler 12 is inserted into the sleeve 16 of the female coupler and then rotated a quarter turn allowing the flanges 31 and 32 to engage stop surfaces 41 and 42. With such positive engagement, the coupler cannot be disconnected accidently or otherwise unintentionally.

Considering the coupling apparatus in more detail, with reference to FIGS. 2 and 3, the female coupler 14 has a body or housing portion 13 having a central bore 35 extending axially therethrough. At the fluid hydraulic hose coupling inlet 19, the fluid inlet side in this case, the housing 13 is internally threaded to receive a reducing plug 37 to facilitate connection of the female coupler 14 to a hydraulic hose 38. An O-ring 36 located in groove 36' provides a fluid seal between plug 37 and body 13.

The other end of the housing 13 is counterbored providing an increased inner diameter defining an engagement bore 39 adapted to receive the tip 17 of the male coupler 12. The engagement bore 39 defines channel 33 on the inner surface of the sleeve portion 16 which receives the quarter round flanges or projections 31 and 32 of the male coupler 12 when the couplers are assembled together. The channel 33 terminates just before the end of the tip portion 17 defining lip portions or stop surfaces 41 and 42 which are engaged by the flanges 31 and 32. A coil spring 43 located within the channel 33 is engaged by the retaining flanges 31 and 32 as the tip 17 is inserted into the sleeve. The spring 43 is compressed as the male coupler is pushed into the female coupler and rotated a quarter turn to align the retainer flanges 31 and 32 with the stop surfaces 41 and 42. The spring 43 urges the retainer flanges 31 and 32 into firm engagement with the lip portions 41 and 42 when the couplers are connected.

The ball valve 21 is mounted in the body 13 adjacent to the fluid inlet side 19. As best shown in FIG. 3, the fluid ball valve includes ball 21 which is coupled through a ball stem 42' to operate handle 22. The ball has a central bore 44 extending between flat side surfaces 45 and 46, defining a portion of the fluid flow path through the female coupler when the valve is in the open position. As shown best in FIG. 2, teflon valve seats 47 and 47' are provided on either side of the ball 21, the valve seats having a central aperture corresponding in diameter to the diameter of the bore of the ball 21 and of the inlet coupler 14. When the ball is rotated a quarter turn, curved surfaces of the ball 21 are moved into engagement with the valve seat, blocking the fluid flow path through the coupler 14.

Referring again to FIG. 3, the ball 21 has a notch 51 in the upper surface thereof which is engaged by an extension 52 on the bottom of the ball stem 42'. The ball stem has a shank 53 which extends through a counterbored aperture 54 in the upper surface of the body 13 and through an aperture 55 in the handle 22. A lock nut 56 engages a threaded portion of the shank 53 to secure the handle to the ball stem 42'. The aperture 55 is oblong to ensure positive engagement between the handle 22 and the ball stem shank 53 which is flattened on opposite sides. A teflon stem seal 57 which is positioned on the ball stem 42' provides a bearing surface at the inner surface of the housing 13 and a seal between the stem and body. As shown in FIG. 2, the inner surface of body 13 defines a recessed portion 60 in which the bottom edge of the ball stem 42' and the teflon stem seat 57 are received and wherein stem 42' connects to ball 21. A teflon stem disk 61 is positioned on the valve stem and located in the countersunk portion of the aperture 54 on the outside of the housing 13. Spacer members, including a flat washer 62 and a pair of Belleville washers 63 and 64 are positioned between the stem disk 61 and the bottom surface of the handle 22.

For the purpose of relieving pressure within the assembled couplers, the female coupler may be provided with a purge valve 84, shown in FIG. 1, which is threaded into a tapped port 85 provided in the body 13.

The male coupler 12 includes ball valve 24 which is similar to ball valve 21 of the female coupler. Accordingly, the valve 24 will not be described in detail, and elements of valve 24 which correspond to those of valve 21 shown in the drawings have been given the same reference numeral but with a prime notation. The body or housing portion 15 of the male coupler is threaded adjacent to its outlet end 18 to receive a reducing plug 71 which facilitates connection of the male coupler 14 to the hydraulic hose of the apparatus requiring hydraulic fluid. An O-ring 73 which is received in groove 72' provides a seal between plug 71 and body 15.

The other end of the body 15 has a reduced diameter defining the engagement tip 17. As shown best in FIG. 1, quarter round flanges 31 and 32 are provided at diametrically opposed positions on the surface of the tip 17 to define the retaining flanges for the mating couplers. A peripheral groove 74 receives an O-ring 75 which seals against fluid leakage through the outside of the couplers through channel 33 when the couplers are assembled together.

Referring to FIG. 3, in assembling the female coupler 14, the valve seat 47 is inserted into the body 13 and positioned in abutting relationship with a shoulder 49 defined on the inner surface of body 13. With a teflon stem seat 57 positioned on the ball stem 42', the ball stem is inserted into the body and positioned with its shank 53 projecting through aperture 54. The teflon stem disk 61 and washers 62–64 are placed on the shank, with the Belleville washers 63–64 opposing each other. The handle is slid on top of the Belleville washers 63–64 and the locking nut 56 is tightened onto the threaded shank 53 of the ball stem 42'. After the stem has been assembled, it is moved to the closed or non-flow preventing position, with the handle extending perpendicular to the coupler and projection 81 of the handle being located in a detent 82 formed on the top side of the housing. The ball 21 is then slid into the body and positioned so that the slot 51 is engaged by the projection 52 on the bottom of the ball stem 42'. The other teflon ball seat 47' is placed into the backup reducing plug 37 and received to abut against shoulder 79 formed therein. With the O-ring 36 located in the groove 36', the reducing plug is threaded into the body behind the ball and tightened completely down to a desired torque. The pressure relief or purge valve 84 is threaded into its hole 85 and seated to specifications. The spring 43 is then positioned in the coupling end of the female unit 14 until it is positioned behind the retaining lips 41 and 42.

Assembly of the male coupler as to the ball valve 24 and reducing plug is the same as for the female coupler, and accordingly will not be described in detail. In addition, sealing ring 73 is slid into its groove 72'.

In FIG. 1, both valves 21 and 24 are shown in the closed or non-flow preventing position with projections 81 and 81' engaging respective detents 82 and 82'. To connect the couplers, first the hydraulic control valve on the tractor is operated to the float position. Then the tip 17 of the male coupler, with the male coupler rotated a quarter turn relative to the female coupler, is inserted into the engagement bore of the female coupler sleeve portion 16, until the retaining flanges 31 and 32 clear the lip portions 41 and 42. The rear inner edges 91 of the sleeve channel 33 are tapered to facilitate clearance of sealing ring 72 as the couplers are assembled together. As the male coupler 12 is being pushed into the female coupler, against the force of spring 43, compressing the spring, coupler 14 is rotated one-quarter turn. This brings the retaining flanges 31 and 32 into alignment with the stop surfaces 41 and 42, respectively. Spring 43 drives the retaining flanges 31 and 32 into engagement with the back side of the lips 41 and 42. After the couplers are connected together, the ball valves 21 and 24 of the two couplers are operated to the open position so that projections 81 and 81' engage respective detents 83 and 83'. The hydraulic control valve on the tractor is then opened, supplying pressurized hydraulic fluid to the coupling assembly 10. Seal 72 prevents loss of fluid through the connection between the couplers 12 and 14 by preventing fluid flow to the exterior through channel 33 and mating surfaces between sleeve 16 and tip 17.

In accordance with a feature of the coupler apparatus 10, the positive self-locking assures that the coupler cannot be disconnected accidently or otherwise without the internal pressure being relaxed or released. To disconnect the coupler assembly, the input pressure is released by putting the tractor or machine hydraulic control valve in the float position. Then the handles on the coupler valves 21 and 24 are operated to the closed positions with the projections 81 and 81' engaging detents 82 and 82', respectively. The pressure within the coupling is released by operating the purge valve 84. Then the male and female couplers can be separated by rotating the male coupler a quarter turn and sliding it out of the sleeve 16.

The coupler can be made without the purge valve for use in some applications. With the purge valve in the coupler, to disconnect the coupler, put the handle in closed position (as in FIG. 1), relieve pressure between balls with the purge valve and then disconnect the coupler.

Without the purge valve:

1. Place the hydraulic control valve (or tractor) in float position.
2. Close the male coupler ball valves.
3. Push in and rotate the male coupler.
4. Close the female coupler.
5. Remove the male coupler from the female coupler.

Although but one specific embodiment of this invention is herein shown and described, it will be understood that details of the construction shown may be altered or omitted without departing from the spirit of the invention as defined by the following claims.

We claim:

1. A quick-disconnect high pressure hydraulic coupling assembly for interconnecting first and second hydraulic lines, said coupling assembly comprising:

relatively elongated male and female coupler members each connectable at one end thereof to a different one of said hydraulic lines and each having a longitudinally extending bore defining a passageway through the associated coupler member, each of said bores being of substantially the same diameter except for a cylindrical enlargement adjacent said one end and said female coupler member having a sleeve portion defined by an increased diameter of its bore at the other end thereof, said male coupler member having a tip portion defined by a reduced outer diameter at the said other end thereof said sleeve portion being adapted to receive said tip portion of said male coupler member in telescoping engagement with the passageways of the coupler members in alignment defining a fluid passageway through the coupling apparatus, locking means for retaining said tip portion within said sleeve portion when the male and female coupler members are coupled together, said locking means including a radially outward extending, partially circumferential projection formed on said tip portion and a retainer channel formed in the inner surface of said sleeve portion for receiving said projection and defining a radially inward extending stop surface at said other end of said female coupler member extending partially around the periphery of said sleeve portion, and spring bias means in said channel for urging said projection into engagement with said stop surface when the coupler members are coupled together, each of said coupler members including fluid flow control means operable between flow permitting and flow preventing positions to control fluid flow through the associated coupler member, said flow control means for each coupler member including a valve in its associated enlargement operable to interrupt the flow path through the bore of its coupler member when the valve is operated at its flow preventing position, and to complete the flow path through its coupler member when the valve is operated to its flow permitting position, the valve when in flow permitting position defining an unrestricted fluid passageway through its coupler member, said valve for each coupler member including a ball and two valve seats spaced longitudinally in its associated enlargement, each of the balls being mutually operable and including a handle located externally of its associated coupler member and removably coupled to the ball located within the coupler member for moving the ball between a flow permitting position in which its bore is aligned with the port of the valve seat and a flow preventing position in which the ball seals off the port, fitting means at each coupler member one end for connecting said apparatus to a hydraulic line threadably connecting to its associated coupler member and having a flow passage extending therethrough of a size at least as large as said bore, said fitting means having one end adjacent said enlargement whereby said ball is readily introduced into said enlargement after removal of said fitting means, and a circular seal interposed between said tip portion and inner surface of said sleeve portion.

* * * * *